(12) United States Patent
Ghannam et al.

(10) Patent No.: US 9,710,458 B2
(45) Date of Patent: *Jul. 18, 2017

(54) SYSTEM FOR NATURAL LANGUAGE UNDERSTANDING

(71) Applicants: Rima Ghannam, San Francisco, CA (US); Maan Ghannam, Beirut (LB)

(72) Inventors: Rima Ghannam, San Francisco, CA (US); Maan Ghannam, Beirut (LB)

(*) Notice: Subject to any disclaimer, the term of this patent is extended or adjusted under 35 U.S.C. 154(b) by 0 days.

This patent is subject to a terminal disclaimer.

(21) Appl. No.: 14/793,760

(22) Filed: Jul. 8, 2015

(65) Prior Publication Data

US 2016/0041967 A1 Feb. 11, 2016

Related U.S. Application Data

(62) Division of application No. 13/506,142, filed on Mar. 29, 2012, now Pat. No. 9,110,883.

(60) Provisional application No. 61/516,302, filed on Apr. 1, 2011.

(51) Int. Cl.
| | |
|---|---|
| *G06F 17/27* | (2006.01) |
| *G06F 17/30* | (2006.01) |
| *G06F 17/24* | (2006.01) |
| *G06F 17/28* | (2006.01) |

(52) U.S. Cl.
CPC ........ *G06F 17/2785* (2013.01); *G06F 17/241* (2013.01); *G06F 17/248* (2013.01); *G06F 17/271* (2013.01); *G06F 17/277* (2013.01); *G06F 17/28* (2013.01); *G06F 17/30684* (2013.01)

(58) Field of Classification Search
CPC .................................. G06F 17/27; G06F 17/30
USPC ............ 704/9, 8, 4, 3, 2, 10; 715/230, 236; 707/999.1
See application file for complete search history.

(56) References Cited

U.S. PATENT DOCUMENTS

| | | | | |
|---|---|---|---|---|
| 4,914,590 | A * | 4/1990 | Loatman | G06F 17/279 704/8 |
| 5,227,971 | A * | 7/1993 | Nakajima | G06F 17/2735 704/2 |
| 5,799,268 | A * | 8/1998 | Boguraev | G06F 17/2775 704/10 |
| 6,026,388 | A * | 2/2000 | Liddy | G06F 17/30654 |
| 6,470,306 | B1 * | 10/2002 | Pringle | G06F 17/241 704/3 |

(Continued)

*Primary Examiner* — Michael Colucci

(57) ABSTRACT

A general-purpose apparatus for analyzing natural language text that allows for the implementation of a broad range of natural language understanding applications. The apparatus for natural language understanding analyzes a source text and transforms the source text into a semantically-interpretable syntactic representation (SISR), comprising a syntax template and semantic clause annotations. The general-purpose apparatus for natural language understanding is adaptable to various source text natural languages and is adaptable to various natural language understanding applications, such as query answering, translation, summarization, information extraction, disambiguation, and parsing. A natural language query answering apparatus for answering questions about a source text, whereby the query answering apparatus utilizes the general-purpose apparatus for transforming the natural language query into SISR format.

29 Claims, 9 Drawing Sheets

(56) References Cited

U.S. PATENT DOCUMENTS

| | | | |
|---|---|---|---|
| 2003/0233225 A1* | 12/2003 | Bond | G06F 17/277 |
| | | | 704/4 |
| 2004/0107088 A1* | 6/2004 | Budzinski | G06F 17/27 |
| | | | 704/10 |
| 2005/0108630 A1* | 5/2005 | Wasson | G06F 17/241 |
| | | | 715/230 |
| 2005/0132281 A1* | 6/2005 | Pan | G06F 17/241 |
| | | | 715/230 |
| 2005/0197828 A1* | 9/2005 | McConnell | G06F 17/241 |
| | | | 704/9 |
| 2005/0256889 A1* | 11/2005 | McConnell | G06F 17/30286 |
| 2007/0130112 A1* | 6/2007 | Lin | G06F 17/3002 |
| 2007/0239423 A1* | 10/2007 | Miller | G06F 17/2818 |
| | | | 704/2 |
| 2009/0019032 A1* | 1/2009 | Bundschus | G06F 19/3443 |
| 2010/0063799 A1* | 3/2010 | Jamieson | G06F 17/30731 |
| | | | 704/9 |
| 2010/0332217 A1* | 12/2010 | Wintner | G06F 17/2785 |
| | | | 704/9 |

\* cited by examiner

| prototype # | Unit sequence | | | | |
|---|---|---|---|---|---|
| 1 | Noun 1 | Copula | Noun 2 | | |
| 2 | Noun 1 | Copula | Preposition | Noun 2 | |
| 3 | Noun 1 | Verb | | | |
| 4 | Noun 1 | Verb | Noun 2 | | |
| 5 | Noun 1 | Verb | Noun 2 | Verb | |
| 6 | Noun 1 | Verb | Noun 2 | Verbal Phrase | |
| 7 | Noun 1 | Verb | Fact1 | | |
| 8 | Noun 1 | Verb | Noun 2 | Fact1 | |
| 9 | Noun 1 | Verb | Noun 2 | Noun 3 | |
| 10 | Noun 1 | Copula | Adjective | | |
| 11 | Noun 1 | Copula | Comparative Adjective | Noun 2 | |
| 12 | Noun 1 | Verb | Noun 2 | Adjective | |
| 13 | Noun 1 | Verb | Noun 2 | Preposition | Noun 3 |
| 14 | Noun 1 | Verb | Verbal Phrase | | |
| 15 | Noun 1 | Verb | Noun 2 | Comparative Adjective | Noun 3 |
| 16 | Noun 1 | Verb | Adjective | | |
| 17 | Noun 1 | Verb | Adjective | Verb | Noun 2 |
| 18 | Noun 1 | Copula | Superlative-Adjective Noun 2 | | |
| 19 | Noun 1 | Copula | Superlative-Adjective Noun 2 | Preposition | Noun 3 |
| 20 | Noun 1 | Verb | Superlative-Adjective Noun 2 | | |
| 21 | Noun 1 | Verb | Superlative-Adjective Noun 2 | Preposition | Noun 3 |
| 22 | Noun 1 | Verb | Comparative Adjective | Noun 2 | |
| 23 | Noun 1 | Verb | Noun 2 | Comparative Adjective | Noun 3 |

| 1 | act |
|---|---|
| 2 | being |
| 3 | color |
| 4 | Designation |
| 5 | element |
| 6 | entity |
| 7 | fact |
| 8 | Feeling |
| 9 | gas |
| 10 | gender |
| 11 | liquid |
| 12 | Location |
| 13 | materiel |
| 14 | nomenclature |
| 15 | number |
| 16 | object |
| 17 | phenomenon |
| 18 | process |
| 19 | Qualification |
| 20 | qualifier |
| 21 | quality |
| 22 | Quantifier |
| 23 | quantity |
| 24 | range |
| 25 | set |
| 26 | shape |
| 27 | sight |
| 28 | solid |
| 29 | sound |
| 30 | Status |
| 31 | Substance |
| 32 | taste |
| 33 | temperature |
| 34 | Thought |
| 35 | Time |
| 36 | Token |
| 37 | Unit |

FIGURE 1B

SYSTEM FOR NATURAL LANGUAGE UNDERSTANDING

PRIORITY CLAIM

This application is a divisional of U.S. application Ser. No. 13/506,142 filed Mar. 29, 2012 which claims priority to U.S. provisional patent Application Ser. No. 61/516,302 filed Apr. 1, 2011. U.S. application Ser. No. 13/506,142 is incorporated herein by reference.

FIELD OF THE INVENTION

The present invention relates in general to tools and methods for computational linguistics. In particular, the present invention relates to tools and methods for implementation of natural language understanding applications.

BACKGROUND OF THE INVENTION

Natural language understanding (NLU) applications are applications that utilize computing machinery to produce actionable information from processing source texts written in natural language. Typically, NLU applications will process one or more source texts, written in one or more natural languages, and in conjunction with a stored dataset of domain knowledge, generate actionable information. Examples of general NLU application categories include machine translation, question answering, and automated summarization, among many others. Domain-specific examples of NLU applications include medical diagnosis systems, quantitative trading algorithms, and web search, among many others.

One early attempt at building an NLU application in the broad domain of commonsense reasoning was undertaken by the CYC project (Lenat et al, 1989). The goal of the CYC project was to construct a knowledge base of common sense facts that would enable an NLU system to parse as the source text a typical desk encyclopedia into actionable knowledge. The CYC experiment employed specifically trained technicians that would manually enter the common sense facts. Despite the high expense of human effort required to construct the knowledge base, the project was unsuccessful, to this date, in achieving its goal, illustrating the difficulties in constructing complete knowledge bases by manual means.

Thus, many recent techniques and approaches for implementing NLU systems focus on either restricting the domain of the problem space or utilizing automatic means to derive various sorts of asserted or non-asserted relations. However, in these conventional techniques, the actionable information produced by such systems is significantly lacking in accuracy and completeness compared to information capable of being produced by human processing.

One approach to implementing practical NLU applications is to restrict the domain of the problem. This may involve applying restrictions in the scope of the source text or of the output in order to simplify the types of information that are produced and processing techniques required. For example, U.S. Pat. No. 5,721,938, entitled "Method and Device for Parsing and Analyzing Natural Language Sentences and Text", teaches a method for parsing natural language source texts that categorizes words as either noun or verb units. The method is designed for the domain of grammar checker applications, and is not suitable for implementation of other broader NLU applications.

Another approach to implementing practical NLU applications relies on generating output information that is short of full understanding by employing approximate methods. For example, a conventional system for translating a source text into another natural language that generates the literal translation of the source text will commonly produce resultant translations that are erroneous or approximate.

Some NLU systems utilize statistical methods to approximate understanding of the source text when complete understanding is not achievable. For example, U.S. Pat. No. 5,752,052, entitled "Method and System for Bootstrapping Statistical Processing into a Rule-based Natural Language Parser", discloses a method of modifying a rule-based natural language parser using summary statistics generated from a source text. The summary statistics are compiled from a corpus of text that is similar in syntactic properties to the source text in order to estimate the likelihoods that candidate rules should be applied. Using these statistics to implement a rule-based parser thereby results in output that can be erroneous or approximate.

Therefore, what is desired is a general-purpose, accurate, and complete method for natural language understanding capable of delivering actionable information that is suitable to be used in a broad range of NLU applications.

SUMMARY OF THE INVENTION

A general-purpose apparatus for implementing natural language understanding applications is herein disclosed. The apparatus for natural language understanding analyzes a natural-language source text and transforms the source text into a semantically-interpretable syntactic representation (SISR). Then, the SISR is mapped into a set of domain-specific terms. Thus, the apparatus for natural language understanding transforms a natural-language source text into a set of domain-specific terms. The general-purpose apparatus for natural language understanding is adaptable to various source text natural languages and is adaptable to various natural language understanding applications, such as query answering, translation, summarization, information extraction, disambiguation, and parsing.

BRIEF DESCRIPTION OF THE DRAWINGS

The present invention may be further understood from the following description in conjunction with the appended drawings. In the drawings:

FIG. 1A is a table illustrating exemplary clause syntax templates for the English language, FIG. 1B is a table illustrating exemplary noun categories.

DETAILED DESCRIPTION

Figure 2:
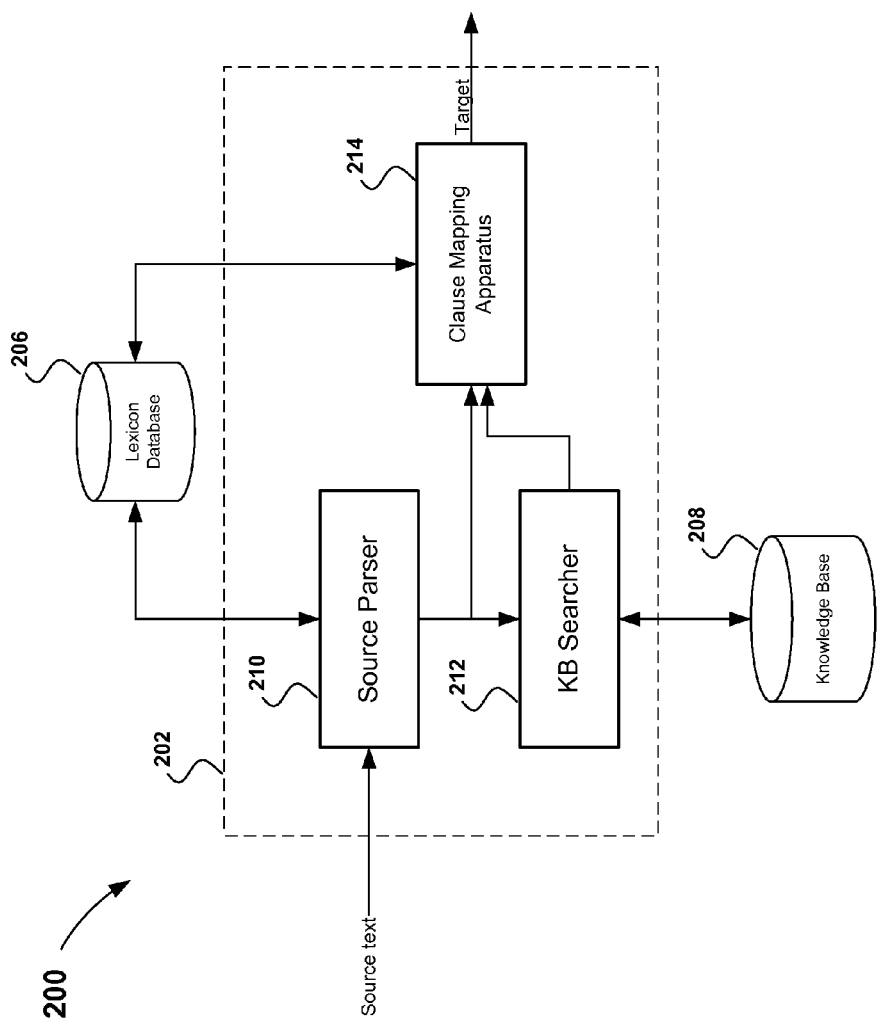
FIG. 2 is a simplified block diagram depicting a general-purpose apparatus for implementing natural language understanding applications.

A general-purpose apparatus for implementing natural language understanding (NLU) applications is herein disclosed. The general-purpose apparatus for implementing NLU applications operates by transforming a natural language source text into an intermediate representation referred to as a semantically-interpretable syntactic representation (SISR), also herein referred to as a "target" representation. The SISR format represents the semantic information contained in the source text into standard templates and fields, enabling a wide range of NLU applications.

The SISR format comprises an identifier, a syntax template (where the clause is represented), the clause complements, and a set of clause annotations. FIG. 1A shows a table 100 of exemplary clause syntax prototypes for the English language. Each row of the table 100 of FIG. 1A represents a syntax prototype for a clause. A syntax prototype is a single, complement-free (unless obligatory) clause that holds all the obligatory components of the independent clause and is expressed in the declarative form and active voice. A syntax template comprises a sequence of one or more SISR units. Each SISR unit derived from the source text maybe one of the following types:

1. noun unit—corresponds to a noun phrase and optionally to the verbal phrase when it acts as subject or object,
2. verb unit—corresponds to a non-copula verb or a phrasal with its intrinsically attached or associated words or utterances,
3. copula unit—corresponds to a copula verb with its intrinsically attached or associated words or utterances. The copula unit is to be omitted if it does not exist in the language of the source text or is to be replaced by its equivalent.
4. adjective unit—corresponds to an adjective (including superlatives), and its intrinsically attached or associated words or utterances, when it modifies the clause.
5. composite adjective unit—corresponds to a comparative adjective when it modifies the clause.
6. preposition unit—corresponds to a preposition or preposition sequence when it does not make part of the noun phrase, or phrasal verb, or comparative adjective.
7. adverb unit—corresponds to an adverb or adverb sequence when it modifies the clause.
8. Fact clause unit—corresponds to a noun clause.
9. Conjunction unit—corresponds to a conjunction.
10. Interjection unit—corresponds to an interjection.

Noun units are additionally annotated with noun categories. Noun categories are semantic categories that nouns are classified into. For example, object, process, sound, etc, may be noun categories. Noun categories may be hierarchical (i.e. a noun may be categorized into multiple noun categories) and are determined in the noun-category lexicon. FIG. 1B is a table that shows an exemplary noun category lexicon.

Upon the processing, each unit is given a specific reference. Aboard this draft when a plurality of SISR units having the same type exists in a single clause, ordinals are used to index their occurrence. For example, "noun1" refers to the first sequential noun phrase and "noun2" refers to the second sequential noun phrase. The types of SISR units may also differ depending on the natural language of the source text to be processed.

For example, the sentence, "The team purchased the old bikes of the city policemen immediately before the competition." may be represented by the template of row 4 of FIG. 1A wherein "The team" functions as noun1, "purchased" functions as verb1, and "the old bikes of the city policemen." functions as noun2. "immediately before the competition" is identified as a complement to the main clause: "The team purchased the old bikes of the city policemen", and furthermore "immediately" functions as adverb1, "before" functions as preposition1 and "the competition" functions as noun3.

Additionally, each clause represented in SISR format includes a set of one or more clause annotations. The set of clause annotations consists of various information relevant to the clause or its complements as with respect to the syntactical aspect or in relation with the process and may comprise among others: a field denoting whether the clause is originally a complement of another clause, a field denoting the identifier of a clause the current clause is a complement of (if any), a field denoting the template prototype of the clause, a field denoting whether the clause is from the original source text or derived in subsequent analysis, a field denoting the beginning time of the effect of the verb of the clause, a field denoting the end time of the effect of the verb of the clause, a field denoting the time nature of the verb of the clause, a field denoting the position in the clause of a complement, a field denoting the tense of the verb of the clause, a field denoting whether the clause itself or its root is derived from the knowledge base or the input source, a field denoting whether the clause is a conditional (e.g., if-then) expression, fields denoting the clauses to which the clause is linked to, a field denoting any linking expression, fields denoting the other clauses issued along with the clause out of the original sentence, a field denoting whether the clause was originally a dependent or independent clause in the sentence, a field denoting the initial clause form (declarative, interrogative, imperative), the initial clause voice (passive, active), a field denoting the clauses context (this information could be obtained with the input), a field denoting the corresponding prototype of the verbal phrase complement, a field denoting the clause that the current clause is issued from (upon mapping) if the case applies. Clause annotations may be read, written, and modified in the process of analyzing the source text.

FIG. 2 depicts a simplified block diagram of a general-purpose apparatus for natural language understanding 202. The general-purpose apparatus for natural language understanding 202 comprises a source parser 210, a knowledge base searcher 212 and a clause mapping apparatus 214. The general-purpose apparatus for natural language understanding 202 communicates with a knowledge base 208 and a lexicon database 206. The general-purpose apparatus for NLU 200 takes in as input a source text, the source text gets fed to the source parser 210. A source text is a sequential, digital representation of information encoding natural language. For example, the source text may be, but is not limited to, a news story, an encyclopedia entry, a magazine article, an internet web page, or any other text in natural language. Additionally, multiple source texts may be taken in as a stream of digital information. The source parser 210 takes in the source text and in conjunction with a lexicon database 206, generates a representation of the source text in the system format, referred to as the semantically-interpretable syntactic representation (SISR).

The output SISR of the source parser 210 is then fed to a knowledge base searcher 212, as well as fed to a clause mapping apparatus 214. The knowledge base searcher 212 takes in as input the output SISR from the source parser 210 and uses components of the SISR to lookup entries in a knowledge base 208 that match certain criteria. The entries of the knowledge base 208 to be matched are also represented in SISR. The output of the knowledge base searcher 212 is then fed in combination with the output of the source parser 210 to a clause mapping apparatus 214. The clause mapping apparatus 214 takes the set of these input clauses in SISR format and performs zero or more iterations of mapping. The objective of the clause mapping apparatus 214 is to map the set of SISR clause into a set of domain-specific terms (also known as end terms) pre-defined in the lexicon database 206. In each round of mapping, the working set of clauses is mapped to a succeeding set of clauses, whereby each clause besides already mapped clauses, clauses of form "noun1 copula noun2" (also referred to as Prototype #1 from FIG. 1A, or their equivalents in some languages), or end-term clauses, in the working set of clauses is mapped into one or more clauses in the succeeding set of clauses. The succeeding set of clauses is then used as the working set for the next iteration of mapping. These iterations may continue until the working set of clauses converges (i.e. a round of mapping that yields no changes in the working set). In one embodiment of the invention, the mapping of each clause in the current set is performed utilizing the lexicon database 206. After all iterations of mapping have been completed (or the set of SISR clauses has converged), the final set of clauses in SISR (referred to as the "target" representation) is output from the source analyzer 202. The "target" representation thus encodes the semantic content of the original source text in a format that is able to be utilized for particular NLU applications.

In one embodiment of the invention, the "target" representation is then fed as an input to a particular NLU application processor. The NLU application processor is configured to run a particular NLU application, taking the target representation of the source text in SISR format and the application request. An application request may be, for example, a question, in a question-answering NLU application, a dialogue, for a conversational NLU application, or a parameter, for a summarization NLU application. An application request may also be specified in natural language. The NLU application processor subsequently utilizes the target representation to execute the application request, producing the actionable application output. The operation of the NLU application processor will be described in further detail in a subsequent section.

Source Parsing

Figure 3:
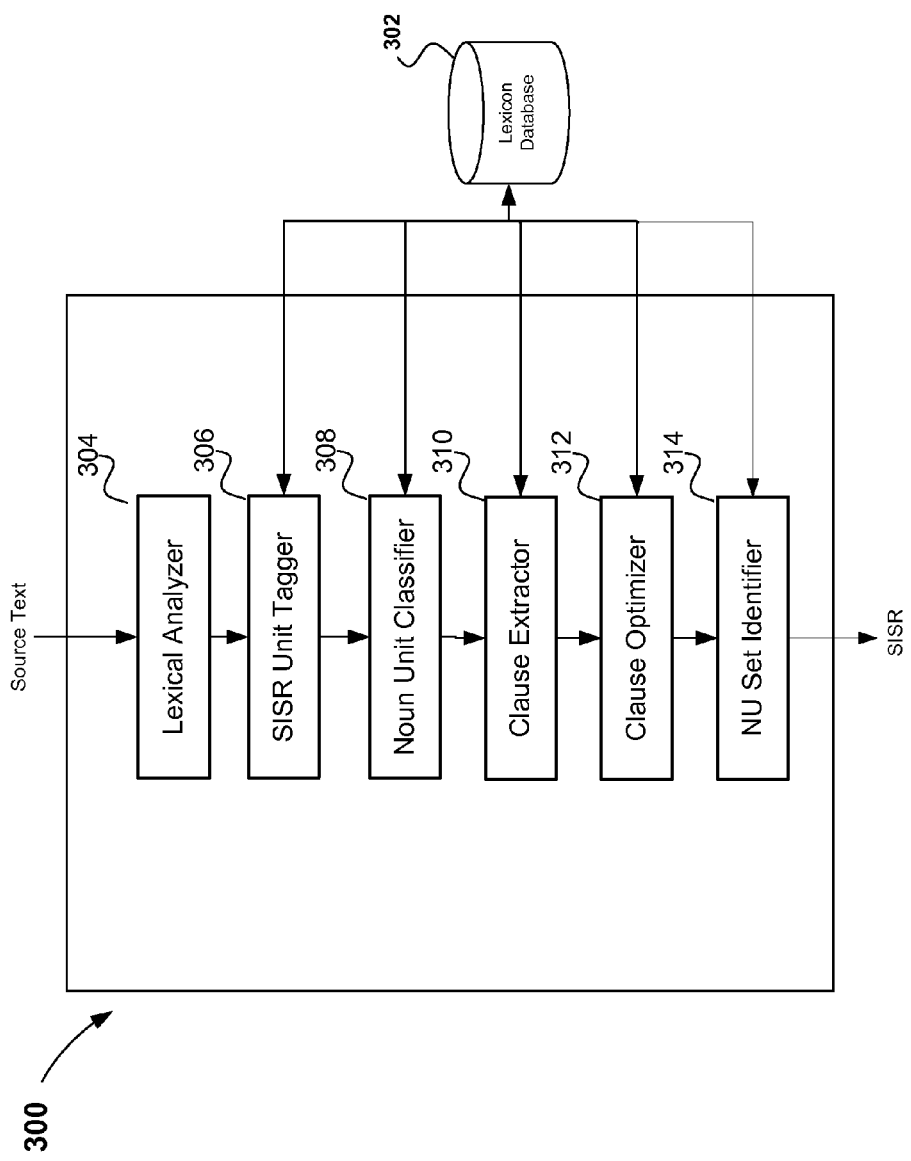
FIG. 3 is a simplified schematic diagram depicting an exemplary source parser embodiment.

As previously described, the object of the source parser 210 is to transform the natural language source text into SISR format. Various implementations of the source parser are possible. FIG. 3 depicts a more detailed schematic diagram of an exemplary source parser 210, according to an embodiment of the present invention. The source parser 300 of FIG. 3 comprises a lexical analyzer 304, a SISR unit tagger 306, a noun unit classifier 308, a clause extractor 310, a clause optimizer 312, and a noun unit set identifier 314. The source parser 300 is in communication with a lexicon database 302. The source parser 300 is configured to adopt one version to feed it for further processing out of the plurality of versions that could possibly get generated by the cumulative work of its processors. Whenever the choice of the optimum version is not attainable by the methods recognized in the prior art, the source parser 300 could use the present system to evaluate one version at a time and choose among them.

The lexical analyzer 304 is configured to receive the source text and perform various lexical analyses. Thus, the source text input is partitioned into a stream of lexemes that fully represent the original source text. Various techniques for lexical analysis are readily known by those of ordinary skill in the art. The lexical analyzer 304 of the current embodiment typically performs sentence segmentation on the input source text using methods known in the prior art.

For example, one simple method of sentence segmentation is to split the source text by full stop punctuation marks. More sophisticated methods of sentence segmentation may utilize various features of the source text in proximity of the full stop to classify the sentence boundaries, depending on the natural language of the source text. Typically, the lexical analyzer 304 of the current embodiment subsequently tokenizes each sentence into a sequence of words whereby each word has an associated grammatical type (such as noun, verb, etc.), using methods known in the prior art. "Word" as used in this specification, as known by a person of skill in the art, includes the notion of constituents equivalent to words in non-English languages.

The sequence of annotated words produced by the lexical analyzer 304 is subsequently fed to a SISR unit tagger 306. The SISR unit tagger 306 is configured to receive the sequence of words and to group them, resulting in a sequence of SISR units. A plurality of words may be used to form a single SISR unit. Thus, matching a word with its corresponding grammatical type into one SISR unit and then tagging said SISR unit with its corresponding type (such as noun unit or verb unit, etc). Additionally, missing or elided words in a unit as identified by the SISR unit tagger 306 as well as elided units should be replaced by a variable or the real word or unit if known. For example, the clause "the building is the best" is transformed into "the building is the best building", where the missing word "building" is inserted into the SISR unit "the best building" as the SISR unit serves as a noun unit in the clause. The anaphors are replaced by their referred back units. As for the interjections, idioms, and metonyms, they are replaced by the corresponding representation in a special lexicon (e.g. an idioms lexicon) 302 prior to the tagger 306 operations.

According to the current embodiment of the invention, the output of the SISR unit tagger 306 is then fed to the noun unit classifier 308. For each instance of a noun unit in the stream of tagged SISR units output by the SISR unit tagger 306, the noun unit classifier 308, determines a candidate set of noun categories for the noun unit as a function of its head noun. In general, a single noun unit, may have multiple noun categories. For example, the noun unit with the head noun "school" may refer alternatively to an entity, an institution, a location, a time, or even a set (e.g., a school of fish). In one embodiment of the invention, the noun unit classifier 308 utilizes a lexicon database 302 to associate tagged SISR units to categories. FIG. 1B shows an exemplary noun category lexicon that may be utilized by the noun unit classifier 308 to perform classification. In this classifier, disambiguation keys could be worked out and associated with the different units of the sentence.

The tagged SISR units are subsequently fed to a clause extractor 310, which identifies valid clauses from the sequence of SISR units. The clause extractor 310 converts the sentences into the declarative form and active voice and assigns variables to complete the clauses. The identified clauses are formed by the group of sequential SISR units and are represented in SISR format. Each sentence of the source text is typically comprised of multiple clauses (e.g. compound sentences). The clause extractor 310 determines the multiple clauses of the given input sentence and further identifies the clauses as one of independent clause, dependent clause, or noun clause, as well as identifying the complements, the conjunctions and the linking expressions associated with each clause. Subsequently, the identified clauses, the complements, the conjunctions and the linking expressions are loaded into the SISR representation fields. In an alternative embodiment of the invention, the clause extractor 310 delineates the clauses by matching the clauses with entries of the left side lexicons while their noun units are expressed in terms of their categories. The clause extractor 310 completes for this sake the dependent clauses by existent units or variables. The clause extractor 310 adds also the needed clauses to cover for the lost information by turning the initial clauses into the declarative form. Moreover, by the clause extractor 310 the verbal phrases that do not correspond to a unit in a clause prototype, get replaced in the clause by noun unit references pointing out to SISR entries. Such noun units could be of the form "fact x" or "act y" where "x" and "y" are the SISR entry identifier. One or more clauses are constructed out of the verbal phrase and installed in the pointed out entry. Variables are assigned to complete the clause. On the other hand, the clause extractor 310 extracts the clauses embedded in a noun unit. It analyzes for this purpose the whole noun unit structure, the simple noun phrases in the noun units and the nominal compounds. The analysis of the whole noun unit structure is performed by comparing it with the noun unit lexicon. The noun unit is matched with a left side entry of the lexicon to construct the clause or clauses as delineated in the corresponding right side entry of the lexicon. The analysis of a simple noun phrase in a noun unit is performed by comparing it with the simple phrase pre-modification words lexicon. The noun unit is matched with a left side entry of the lexicon to construct the clause or clauses as delineated in the corresponding right side entry of the lexicon. The nominal compounds analysis is performed in a straight forward manner for two words compound. In this case the nominal compound is matched with a left side entry of the two-word nominal compounds lexicon to derive the clause stated in the right side corresponding entry. However if the nominal compound exceeds two words, the clauses derivation is done by processing two words at a time in the order proper to the natural language. For example "subway chance acquaintance" would result in "the acquaintance happened by chance", "the chance took place in the subway". In one embodiment of the invention, a clause optimizer 312 computes additional values of various clause annotations on each of the clauses and may generate clauses or make modifications to the clause template. These clause optimizations may include, but are not limited to: the clause prototype, the other clauses to which this clause is linked, the linking expressions, clauses relations, the position of the complements in the clause, the other clauses issued along with the clause out of the original sentence, indication if the clause was a dependent or independent clause in the sentence, the clauses verb tense, the initial clauses form (declarative, interrogative, imperative), the initial clauses voice (passive, active), the clauses initial derivation (knowledge base, input source), a field denoting whether the clause is from the original source text or derived in subsequent analysis, a field denoting whether the clause is originally a complement of another clause, a field denoting the identifier of a clause the current clause is a complement of (if any), a field denoting the time nature of the verb of the clause, a field denoting whether the clause is a conditional (e.g., if-then) expression, the clauses context (information that could be obtained with the input), the corresponding prototype of the verbal phrase complement. The optimizer refers to the lexicon of linking expressions for annotation and clause generation upon encountering linking expressions. The optimizer refers also to the lexicon of verbs time nature for time nature annotation.

In an exemplary configuration system of the mapping and lexicon construction, the clause optimizer 312 marks the category assigning prototype #1 clauses (as shown in FIG. 1) and appends where applicable the new category to the categories already annotated to the clause subject. Some prototype #1 clauses or their equivalent in other languages assigns categories to the clauses nouns. For example "the teacher is a musician". This is opposed to other clauses such as "the cause of the fire is a short-circuit" where no category assignment is performed for a noun in the clause.

In one embodiment of the invention, the noun units in the clause are further analyzed by the noun unit set identifier 314 to identify mathematical sets. The noun unit set identifier 314 identifies the presence of two kinds of mathematical sets: by-intension sets and by-extension sets.

By-intension sets are identified by matching noun units that are addressed by restrictive adjective clauses (i.e. clauses that place a condition upon the noun unit the clause modifies). For example, in the sentence "The paleontologists who visited the museum last month registered their opinion", the phrase "who visited the museum last month" acts as a restrictive adjective condition on the noun unit "paleontologists". Semantically, the noun unit "paleontologists" can be identified as a by-intension set modified by the condition "visited the museum last month". Thus, the original clauses can be transformed into a base clause "X registered their opinion", where X is a variable representing the mathematical set "paleontologists".

By-extension sets are identified by matching a sequence of noun units (performing the POS-role of objects or subjects) as a specified set. For example, the sentence "Peter, John, Elsa and Rudy climbed the cliff", could be decomposed into a base clause "Y climbed the cliff", where Y is a variable created to represent the set {"Peter", "John", "Elsa", "Rudy"}.

The resultant optimized clauses in SISR format are then output from the source parser 210 fed to the knowledge base searcher 212 and clause mapping apparatus 214.

Knowledge Base Processing

In order to facilitate a complete understanding of the source text that allows for a broad range of NLU applications, implicit information about the world that is not explicitly stated in the source text must additionally be included in the analysis. Thus, the set of clauses transformed from the source text must be augmented with world knowledge in order to form a more complete basis for semantic inference. There are many ways world knowledge could be organized into in certain data sets and assigned various keys in order to assist in retrieving the most crucial information.

Figure 4:
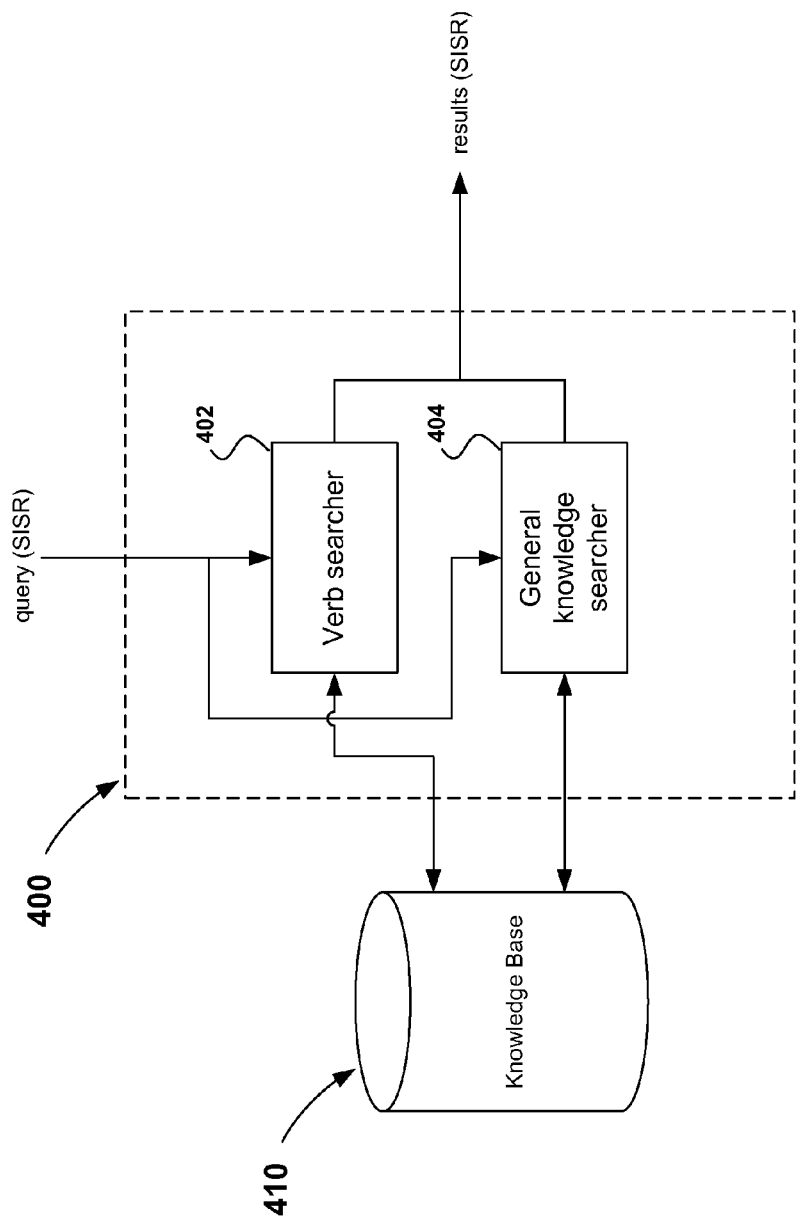
FIG. 4 is a simplified schematic diagram of a knowledge base searcher apparatus.

FIG. 4 depicts a simplified schematic diagram of a knowledge base searcher embodiment 400. The knowledge base searcher 400 comprises a verb searcher 402 and a general knowledge searcher 404. Additionally, a knowledge base 410 is used to store the encoded knowledge. The knowledge base 410 comprises various datasets. In one embodiment of the invention, the datasets comprising the knowledge base 410 are arranged with respect to each word or group of words in a priority to their most relevant links. The subject of the dataset could be among others a word, a group of words or a concept. The priority corresponds to the frequency of connections of the elements of each datum with the subject of the dataset revealed in the knowledge base source.

The knowledge base searcher 400 operates by receiving a set of clauses in SISR format that function as the query. In the current embodiment of the invention, the output of the source parser 210 is used as the input to the knowledge base searcher 400. The input clauses then get multiplexed to a verb searcher 402 and a general knowledge searcher 404. The verb searcher 402 identifies the verb unit in each input clause and performs a keyword lookup in the knowledge base 410. The knowledge base 410 encodes zero or more clauses for each verb that are related to clarifying the verb definition. Simultaneously, the general knowledge searcher 404 performs a keyword lookup on various units of the clause (such as the nouns, adjectives, verbs, etc.) of the query on the knowledge base 410. The knowledge base 410 encodes zero or more clauses for each word that pertain to common knowledge about the world. This includes commonsense knowledge that a typical human reader would possess when reading the source text. Finally, the lookup results (in SISR format) from the verb searcher 402 and the general knowledge searcher 404 are aggregated to form the output results (in SISR format), representing the implicit knowledge that is relevant to the given source text.

The implicit knowledge (in SISR format) returned by the knowledge base searcher 212 and the explicit knowledge (in SISR format) derived from the source text by the source parser 210 are then subsequently aggregated to form the operating set of clauses fed to the clause mapping apparatus 214, detailed in FIG. 5.

Clause Mapping

Figure 5:
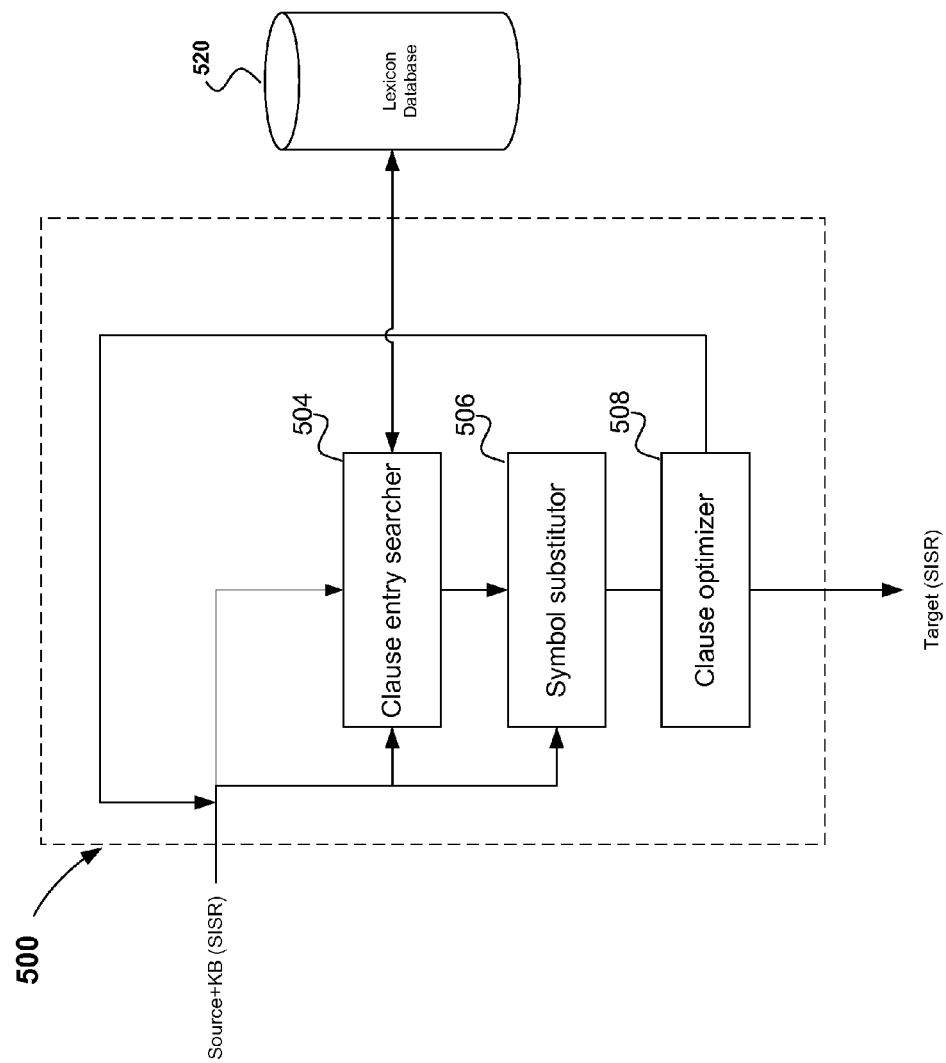
FIG. 5 is a simplified schematic diagram of an exemplary clause mapping apparatus embodiment.

FIG. 5 shows a simplified schematic diagram of a clause mapping apparatus 500 and a lexicon database 520. The clause mapping apparatus 500 comprises a clause entry searcher 504, a symbol substitutor 506, and a clause optimizer 508. In the embodiment of the invention pictured in FIG. 2, the clause mapping apparatus is configured to receive the combined clause set from the source parser 210 and the resultant clauses from the knowledge base searcher 208. During the source parser 210 stage, a clause prototype is identified for each of the clauses in the source text. Each clause prototype except for prototype #1 of FIG. 1 in English or its equivalent in other languages corresponds to a lexicon in the lexicon database 520. Prototype #1 of FIG. 1 relates to noun categories, which are not further mapped. The clause prototype matches the left side of the given lexicon it corresponds to. For example, for the input clause "the blue team accelerated the car", the source parser 300 would identify this input clause as the clause prototype 'non-copula verb clause'. This prototype corresponds to the non-copula verb clause lexicon.

Utilizing the clause prototype and noun categories determined by the source parser 300, the clause entry searcher 504 performs a lookup in the appropriate lexicon in the lexicon database 520 in order to match the main clauses or the complement with a lexicon entry. This is performed by using the clause literals where the noun units are in terms of their initial categories or assignments. For example, for an input clause "the blue team accelerated the car" corresponding to a clause template "noun1 verb noun2", the clause entry searcher 504 would perform the query on the non-copula verb clauses lexicon. Then the searcher would also use the most appropriate clause literals to match it with the best left entry available in the lexicon. In this case, the input clause could be represented among others by the following templates: "noun1 accelerated noun2", "party 1 accelerated vehicle 1", The closest available left entry might be "noun 1 accelerated vehicle 1". An example of a non-matching left entry would be "party 1 accelerated process 1".

The resultant clause prototypes found by the clause entry searcher 504 are then fed to a symbol substitutor 506. The symbol substitutor 506 matches each variable unit in the clause prototype with its corresponding literal in the original source clause and sets the value of each variable unit to the corresponding literals matched. For example, after substitution the variables of the clause "the blue team accelerated the car", "noun 1" would be identified as "the blue team" and "vehicle 1" as "the car".

The clauses or complements with their variables identified by the symbol substitutor 506 are then fed to the clause optimizer 508. The clause optimizer 508 performs the tasks of clause generation and clause annotation. The right side of each lexicon displays for each left side entry, its clauses generation templates, its associated annotations as well as keys to help in the choice if various representations exist for a single entry.

The clause optimizer 508 chooses among the right side representations if more than one exists by reference to the joined keys. Then it replaces the variables by the real units deduced by the symbol substitutor 506 and adds the resulting clauses to the clauses working set. The clause optimizer 508 then computes the relevant annotations values. Some of these annotations are deduced by the processing, such as the clause number out of which the present clause originated. Other annotations are derived from the lexicon. In certain cases like for some complements, no clause generation is made but only annotation.

If an entire iteration through all of the clauses of the working set has been performed without any new clauses added to the working set, then the clause mapping apparatus 500 terminates and returns the working set as the "target" set of clauses.

Lexicon and List Construction

The lexicon database contains a plurality of lexicons and lists that are accessed by the general purpose apparatus for NLU and the NLU application processor. These lexicons and lists may be configured to adapt the system to various natural languages.

Various lexicons that are stored in the lexicon database have been previously described. Lexicons comprising the lexicon database relevant to the general purpose apparatus for NLU may fall into the category of: mapping lexicons and parsing lexicons. The construction and choice of lexicons has a significant effect on the operation of the clause mapping apparatus in that it determines the range of available transformations when the lexicon database is used. The lexicons are specified such that clauses are mapped to the desired end terms.

Figure 6:
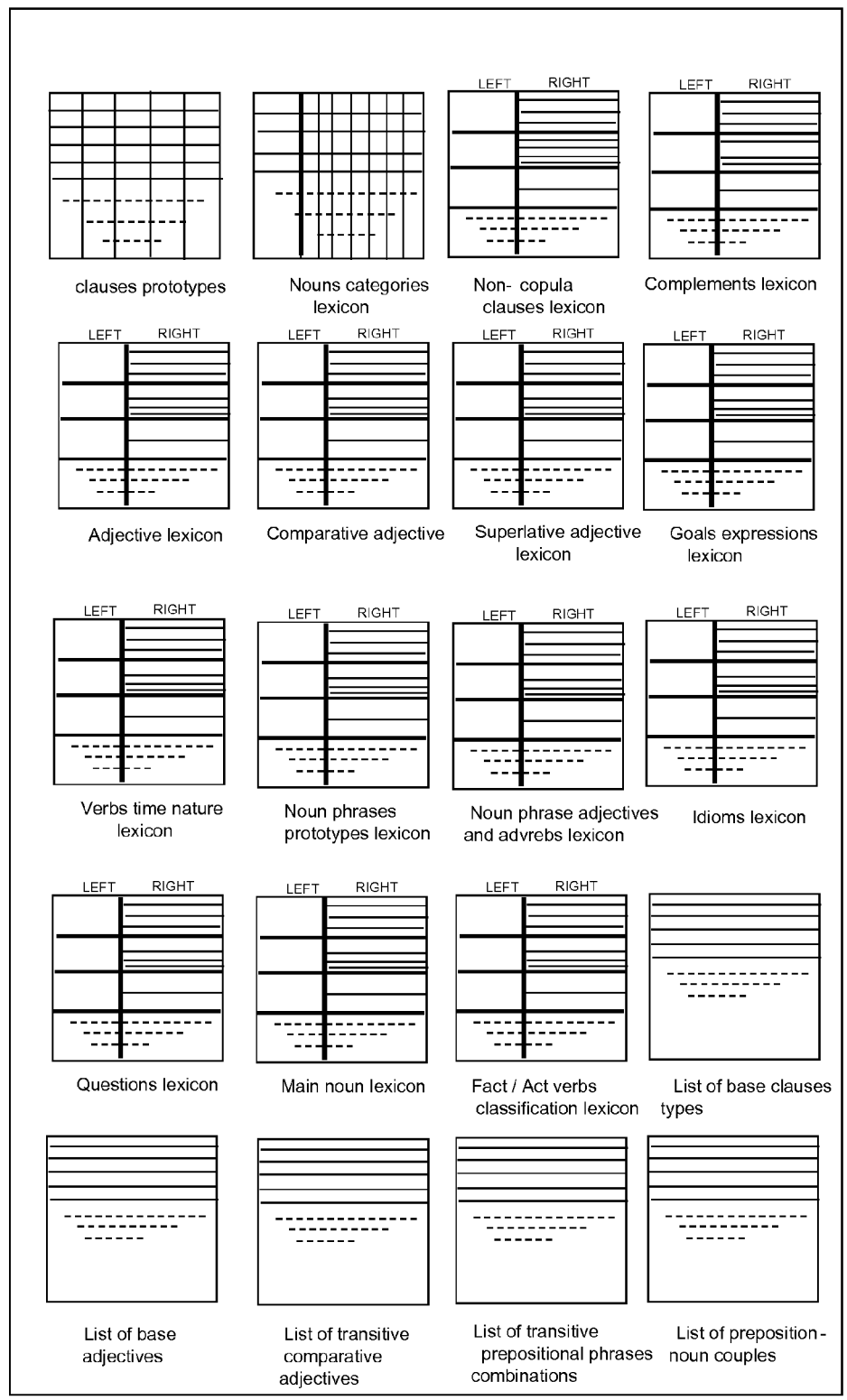
FIG. 6 is a simplified diagram illustrating an exemplary lexicon database.

FIG. 6 shows lexicons that may be represented in an exemplary lexicon database 206 in order to aid the source parser 210 and clause mapping apparatus 214. Typically each lexicon comprises a left-side entry and a right-side value corresponding to the left-side entry. Clauses in the mapping lexicons database are in SISR format. In case a left side entry possesses more than one representation, keys are assigned to each representation to distinguish its applicability and relevance within the text meaning. The lexicon database may include, but are not limited to, the following lexicons:

1. a lexicon of categories tagged nouns, whereby all the nouns are listed in the left side and each noun entry corresponds to a right side entry that lists the possible semantic categories proper to the noun. An exemplary noun category lexicon is depicted in FIG. 1B.
2. a semantic non-copula verb clauses lexicon, whereby each non-copula verb clause template left side corresponds to one or more sets of right side clauses, whereby each set has one or more clauses that together and either as such or upon processing form a semantic equivalence to the left side clause. For example, the left side, non-copula verb clause template "noun1 accelerates vehicle1" could be mapped to the right-side non-copula verb clause template "noun1 increases the speed of vehicle1". The right side lexicon indicates also the relevant annotations with each clause, Exemplary methods of constructing the non-copula verb clause lexicon in a way abiding by the system objective to end up with low hierarchy end terms are described below, 3. a semantic complements lexicon, whereby each left side clause prototype and complement type combination corresponds to a right side that gives the embedded meaning of the left side clause in terms of complement free clauses. Some cases could be represented solely by annotation.
4. a semantic adjective lexicon, whereby each left side adjective clause prototype corresponds to a right side that gives the embedded meaning of the left side clause in terms of clauses different from adjective clauses, unless it is of a base adjective clause prototype. The superlative adjective could be in a separate lexicon,
5. a semantic comparative adjective lexicon, whereby each left side comparative adjective clause prototype corresponds to a right side that gives the embedded meaning of the left side clause according to the comparative adjective method, given below. NDA is the noun derived from the adjective, as "taller than"—"tallness", BCA is a base comparative adjective.

Left side: "noun 1" is "comparative adjective 1" "noun2"
Right side:
Amount "x1" is the amount of NDA of noun 1.
Amount "x2" is the amount of NDA of noun 2.
Amount "x1" is BCA Amount "x2".

6. a semantic superlative adjective lexicon, whereby each left side clause prototype comprising a superlative adjective in its noun unit corresponds to a right side that gives the embedded meaning of the left side clause according to the superlative adjective method as shown below. CSA is the comparative adjective derived from the superlative adjective, as "happier than"—"happiest".

Left side: "noun1" is "superlative adjective 1 noun unit" "preposition 1" "noun2"
Right side: if noun "x1" belongs to the set of noun2
(if) noun "x1" is different from noun 1
(then) noun 1 is CSA noun "x1"

7. a semantic lexicon of the expressions that infer either of: goal, cause, effect, opposition or condition, whereby each left side entry is a prototype occurrence of such expression. And where the right side consists of the clauses and annotations that represents these expressions. This lexicon is referred to upon parsing, and could be a part of the linking expressions lexicon.
8. a lexicon of the verbs and their corresponding time nature, whereby each left side verb corresponds to a right-side time nature, such as instantaneous, span, or absolute,
9. a semantic lexicon of prototypes of consecutive noun phrases, whereby each left side configuration characterized by consecutive simple noun phrases or nouns separated by prepositions corresponds to a right-side equivalent clause template. A simple noun phrase is a noun and its pre-modification words (i.e. its determiners, adverbs, adjective and pre-modifier nouns),
10. a semantic lexicon for representing the pre-modification words in a simple noun unit, whereby each left side simple noun unit prototype containing such occurrence corresponds to right side equivalent clauses templates,
11. a semantic lexicon of two-word nominal compounds (i.e. a sequence of nouns), whereby each left side two-word nominal compound entry corresponds to one or more right side clauses, representing the specific intended meaning of the compound. Optionally, the system can assist in automatically constructing this lexicon.
12. a semantic lexicon of linking expressions occurrence, whereby each left side entry consists of one such occurrence and the right side consists of the clauses and annotations that express the meaning and impact of the expression.
13. a semantic lexicon of the language idioms, interjections and metonyms whereby each left side entry of idiom, interjection or metonym corresponds to a right side of the equivalent meaning representation of these items,
14. a lexicon of the questions prototypes categories, whereby each left side is a question prototype and right side is one of 'cause', 'effect', 'goal', 'time', 'number', 'amount', 'subject', 'object', 'manner', 'location', 'proposition truth', and 'adjective', etc.,
15. a fact or act classification lexicon, whereby each left side entry of verb or verb occurrence prototype corresponds to either 'fact' or 'act' depending on whether the said entry relates to an intentional act.

Lists act as references. The NLU application processing lists are the lists 4 and 5 below, they serve for comparison on the format basis. The other lists are inventories of the adopted terms for the mapping operation:

1. a list of the various clause prototypes (e.g. as shown in FIG. 1A)
2. a list of base template clauses types. These are the adopted end terms, or the lowest hierarchy, where no further representation by other clauses is made.
3. a list of base adjectives (including the comparative adjective). These are the adopted end terms, or the lowest hierarchy, where no further representation by other clauses is made for the adjective clauses containing these base adjectives.
4. a list of the comparative adjectives that have the transitive property; and
5. a list of the prepositional phrases combinations having a transitive property.

Various methods for construction of the lexicons in the lexicon database are possible. In one preferred embodiment of the invention, a semantic non-copula verb clauses lexicon may be constructed by:

1. Compiling into the lexicon instances of "lower semantic level", i.e. a left side verb clause that maps to a equivalent right side verb clause using simpler concepts. The equivalent simpler concepts are concepts that hold individually less information about acts or facts than the initial concept. For example "noun1 accelerates noun2" could be transformed by this technique to "noun1 increases the speed of noun2".
2. Compiling into the lexicon instances of "changing status" clauses, i.e. a left side verb clause that maps to two equivalent right side verb clauses indicating the state of the subject or object of the left side clause before and after the verb is applied. For example the left side clause "noun1 died" could be transformed by this technique to the semantically equivalent clauses "noun1 was alive" and "noun1 is dead".
3. Compiling into the lexicon instances of "assumed condition" clauses, i.e. a left side clause that maps to right side clauses indicating the assumed conditional statement implied in the left side clause. For example, the left side clause "noun1 allows noun2 to do act1"

could be transformed by this technique to the clauses "if noun2 does act1" and "then noun1 will not object".

4. Compiling into the lexicon instances of "assumed facts" clauses, i.e. a left side clause that maps into right side clauses that states the assumed fact or provide clarifications about the fact given on the left side. For example the left side clause "person1 forgives person2" could be represented following this technique by the right side entries "person2 did actX1" and "actX1 had negative effects on person1". "actX1" is a created reference variable for an implied action that took place.

5. Compiling into the lexicon instances of "neutral" clauses, i.e. a left side clause that maps to a set of right side clauses wherein facts from the left side clause are assigned a "neutral flag" in the annotation fields to indicate that the fact is not a ground truth. For example, the left side clause "person1 believes fact1" may be transformed by this technique into the set of clauses NX1:"fact1 is true" and "person1 considersNX1 true". In this example NX1 is a variable labeling the first right side clause identifier. A clause annotation ("neutral flag") is applied to NX1 to indicate that the clause is a "neutral clause" (i.e. it is not a ground truth, but conditioned upon the statement that "person1 considers NX1 true").

6. Compiling into the lexicon instances of "enclosed process" clauses, i.e. a left side clause where the verb assumes a process that maps to a right side clause stating that the subject of the left side clause does the process. For example, the left side clause "noun1 runs" may be transformed by this technique into the right side clause "noun1 does the running process". Using this technique, verbs that are semantically complex (i.e. verbs that describe a process with many details and implications), such as "run" are equivalently represented as noun phrases (e.g. "the running process"). This is beneficial for encoding the various meanings and implications since these noun phrases describing processes can then be further expanded by the knowledge base searcher.

7. Compiling into the lexicon instances of "assumed noun" clauses, i.e. a left side clause that maps to a set of right side clauses indicating nouns that are assumed by the left side verb, but not explicated. For example, the left side clause "noun1 bounces" may be transformed by this technique into the set of clauses "noun1 hits into locationX1" and "noun1 ejectsfromlocationX1". In this example, locationX1 is a variable created to represent the assumed noun by the verb "bounces".

NLU Application Processing

As previously discussed, the general purpose apparatus for natural language understanding enables a variety of NLU applications. Once the natural language source text has been represented in the SISR format and transformed by the clause mapping apparatus into the target format, various manipulations may be performed upon the target format, including, but not limited to: querying for information, inference, and transformation into other natural languages, among others. Various techniques are known by those of ordinary skill in the art for manipulating structured logical representations. By transforming natural language source text into the SISR target format, the general purpose apparatus for natural language understanding expands the applicability of conventional logical reasoning systems.

Figure 7:
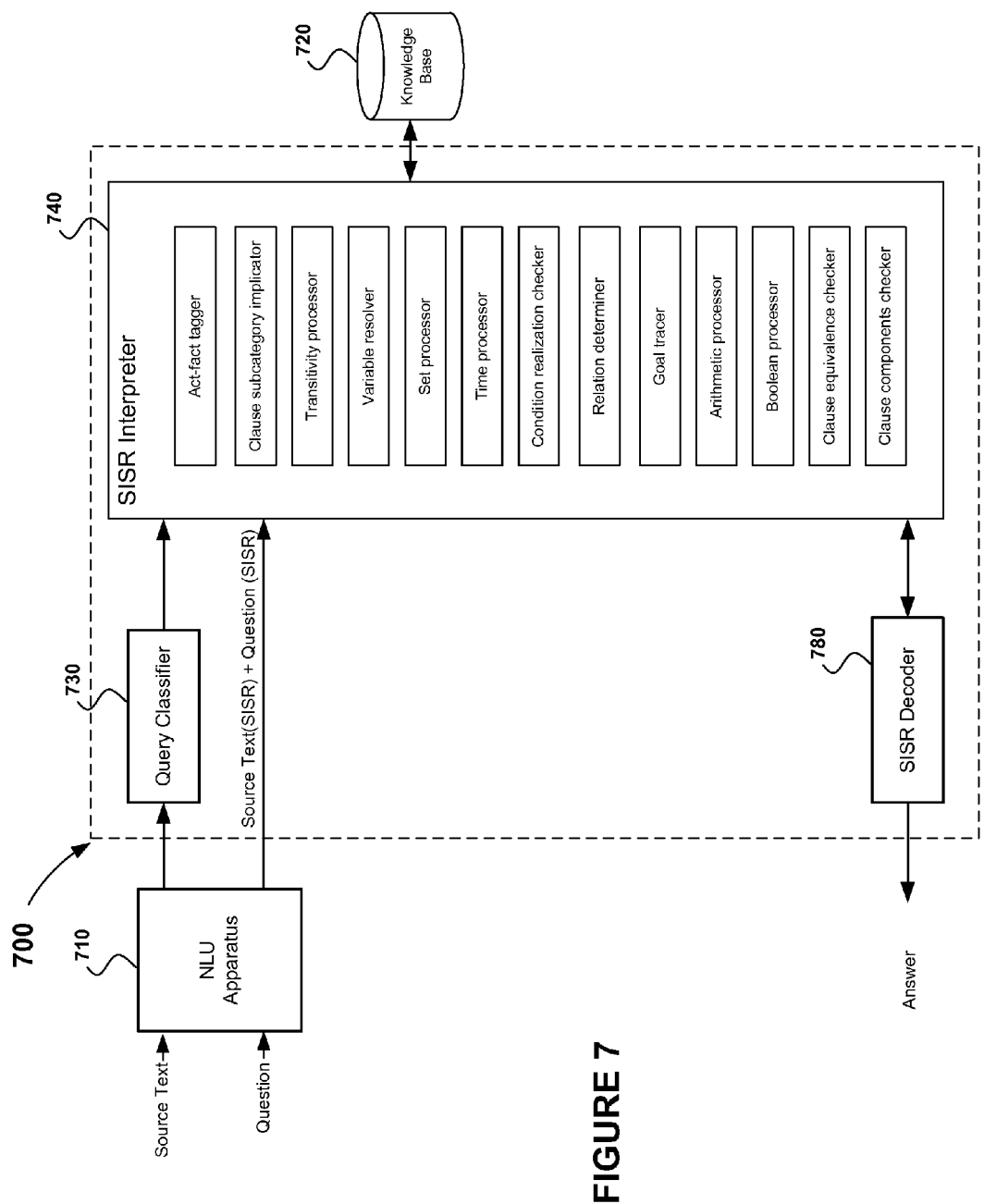
FIG. 7 is a simplified schematic diagram of an exemplary query answering natural language application processor.

One common NLU task that is desired is to perform query answering over a source text besides being a property upon which most of the NLU applications could be built. A source text in natural language is provided and a series of queries for information that is contained in the source text is requested. Queries may be in the form of traditional machine-understandable formats (known as structured queries) or in the form of natural language questions (known as natural language queries). FIG. 7 illustrates a diagram of an exemplary embodiment of a NLU application processor (known as a query answering apparatus) 700, capable of performing the query answering task. The query answering apparatus 700 comprises a query classifier 730, a SISR interpreter 740, and an SISR decoder 780.

The application request may originate from various external systems. In one embodiment of the invention, the application request may be received from a web server connected to a network, serving requests in a server-client scheme. In an alternative embodiment of the invention, the application request may be received from a software application residing on a personal computer. If the application request is in natural language the application request must first be fed to a general purpose NLU apparatus 710 that has been configured for the particular natural language of the application request. The general purpose NLU apparatus 710 transforms the natural language request into the SISR target format. In the case that the application request is structured, it can be immediately transformed into the SISR target format upon adding the relevant knowledge base information. The source text is also transformed by the general purpose NLU apparatus 710 into the SISR target format.

The query answering apparatus 700 receives the source text and application request (also known as the query) in SISR format. The query classifier 730 uses a questions prototype categories lexicon to classify the query into one of the following types: cause, effect, goal, time, number, amount, subject, object, manner, location, proposition truth, preposition, adjective and the entire proposition. It specifies also the arguments implied by the question in accordance with the relevant parameters of the corresponding interpreter processors.

Following the query classifier 730 the data is fed to the SISR interpreter 740, which, depending on the obtained query type identified by the query classifier 730, runs the relevant processors within the SISR interpreter 740. The SISR interpreter input is the target data, the question, the question prototype (the question prototype directly implies or indicates the processors ought to be run) and the arguments implied by the question in accordance with the relevant parameters of the corresponding interpreter processors. The SISR interpreter output is the arguments of the question answer (the interpreter outputs also the question as such in order to be fed to the decoder).

The SISR interpreter 740 comprises the following processors: act-fact tagger, clauses subcategory implicator, transitivity processor, variable resolving processor, sets processor, time processor, condition realization checker, relation determiner, goal tracer, arithmetic processor, Boolean processor, clause equivalence checker and clause components processor.

The act-fact tagger prepares for further data manipulation in a preliminary classification that separates intended acts from non-intended ones. The tagger refers to the verbs act-fact tagging lexicon and any modifier occurring in the SISR clause to tag the whole SISR clause either as a fact or act clause.

The clauses subcategory implicator constructs a new clause relative to a noun out of a clause containing a noun with a broader category or set that includes the said noun. The clauses implicator issues a new clause and adds it to the working set upon checking the right conditions like the clause generality.

The transitivity processor constructs new clauses out of transitive deductions and adds them to the working set. It works by matching selected clauses with the lexicon of transitive clauses and while checking the applicability of the transitive property over them. For example the following two clauses lead to the third one: "The trajectory of the third shuttle is longer than the trajectory of the fifth shuttle.", "The trajectory of the fifth shuttle is longer than the trajectory of the second shuttle.", "The trajectory of the third shuttle is longer than the trajectory of the second shuttle."

The variable resolving processor replaces the noun variables created during parsing, mapping or knowledge base acquisition by the real matching nouns if present in the working set. Despite the previous matching of the variables created during parsing, the matching process at this level could provide better resolving chances for non-resolved variables after the working set augmentation with new clauses like the ones issued from clauses equivalence.

The sets processor works out the various sets and elements relations, thus by checking the different relations between sets and creating new sets out of these relations, and then by checking the belonging of an element to a set, and by establishing the further conditions imposed on any set and element, and then issue the corresponding clauses and add them to the working set.

The time processor establishes time table relative to the events and periods, and works out further time deductions relative to both (events, periods) and clauses. The events-period time table is a table comprising the noun units that fall in the category of event or period and the corresponding time data relative to each of them. For example time data could not be associated to objects, persons and time itself but could be associated to operations, processes and others. The event-period associated data comprises any information to the beginning and end times of the event period. The clauses have additional information about the time nature which is related to the verb. Such time nature points out the type of span (instantaneous, extended period or just absolute). This information is helpful in the deductions and inferences of time data. The clauses time data is present in the annotation. The time processor refers to all time data to check the interconnections and the reliability and precision factor of each data to come out with the optimum data information update. Besides building the time data, the time processor responds to the desired time question by retrieving the relevant specific data.

The condition realization checker conducts an analysis that shows whether a condition is satisfied and adds the logical outcome in terms of new clauses in case of confirmation. For example the realization of the condition clause in this sentence implies the next logical sentence, "if the alarm produces a signal before the boiling point is reached, the control system shuts all the valves in the factory", implies "the control system should have shut all the valves in the factory". Another example "the farmer could harvest the plants when they reach a forty centimeter height". The first clause of the sentence should occur in the working set with an annotation of "neutral". If the condition is satisfied the checker adds a clause stating that the clause is possible. The checker could carry various operations with the different interpretation processors to conclude that the condition is met.

The relation determiner constructs a relations map that indicates the relation between every two clauses or noun units. This relation could be a direct cause, a direct effect, an indirect cause, an indirect effect, one of the direct causes, etc. The relation determiner refers to the annotation fields. It refers also to the clauses for relation implication like the clause "the excess water caused the landslide". Besides building the relations data, the relation determiner responds to the desired relation question by retrieving the relevant specific data.

The goal tracer makes the goal trees that are present in the source text. A goal tree has its base a main goal that branches into other sub-goals that could be abandoned or continued. A goal or sub-goal could be a clause or noun unit representing an act. The tree making could be performed by referring either to the annotations or to the individual clauses and by relying on the act and fact classification as the goal trees are based on act clauses. The goal tracer responds also on inquiries about the relations between specific nodes in the trees.

The arithmetic processor computes requested numerical operations. The involved numbers could be abstract numbers like measurements or linked to sets. In the case of the abstract numbers, the processor works the related clauses to match one of the arithmetic operations to perform the operation. The processor could always refer to the knowledge base to retrieve any required information that completes the facts that enable the matching of the clause with the operation and its terms. In the case of sets the processor matches the type of operation implied on the sets with the arithmetic operation. For example the processor identifies among others whether it is a union, an intersection, a complement of a set, and matches it with the corresponding operation. For instance the result of the union of two sets will be the sum of the sets cardinals minus the cardinal of their intersection set. The arithmetic processor further computes requested amount related operations either by simple amount comparison or the by the parallel usage of the applicable arithmetic operations.

The Boolean processor applies Boolean operations on sets or on clauses. When applied on sets conditions, they should be matched with the sets concepts as intersection, reunion, inclusion, empty sets and others. For example, in the sentence, "The passengers holding blue tickets or green tickets will get extra mileage.", "The passengers getting extra mileage" is the reunion of the set of passengers holding blue tickets and the set of passengers holding green tickets. The sets data are amended with the results and the issuing clauses are added to the working set.

As for the application of the Boolean processor on the clauses, a checking is performed on each one of the linked clauses for a true or false condition. The outcome is determined by linking the conditions with the same Boolean linking of the clauses and working out the results. The issuing clauses are added to the working set.

The clause equivalence checker determines whether a clause like a one occurring in a question has its equivalent in the working set. Such procedure helps in judging whether a clause is true or false. The equivalence checker could rely on one of these cases: a similar existing clause, the existence of similar clauses to the mapping outcome components of the clause, an opposite configuration asserting the non-equivalence, like one opposite component.

The clause components processor responds to the enquiries that have straightforward answer present in the clause itself. Such as subject, object, manner, adjective, location or the clause as a whole.

The output of the interpreter is fed to the SISR decoder 780 which generates a grammatically-valid natural language expression for the NLU application. If desired, an advanced SISR decoder could make use of an output generator so that the provided base sentences get built in more sophisticated natural language output.

Figure 8:
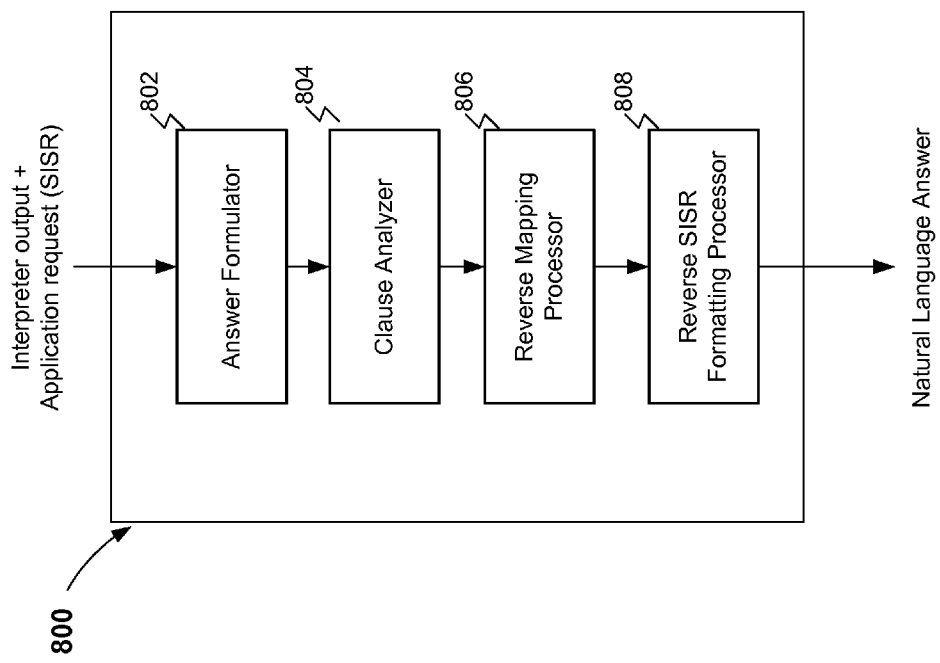
FIG. 8 is a simplified schematic diagram of an exemplary SISR decoder.

FIG. 8 depicts a simplified schematic diagram of an exemplary SISR decoder embodiment. The SISR decoder 800 accepts the interpreter 740 output as well as the question which are fed to the answer formulator 802. The answer formulator 802 is configured to assign an answer template to the question prototype and to associate the interpreter output with the template. The answer template could be a clause with the proper conjunction, a clause with a blank field, or any other form. The interpreter output could be a noun, a "true" or "false" expression, a confirmation or negation, one or many clauses. The answer formulator 802 output is one or more clauses with their complements and annotations. These clauses are intended to be turned into the natural language. These clauses are fed to the clause analyzer 804 that is configured to check with the interpreter 740 for clauses equivalence or other needed operations resulting in a selection of the adopted clauses that get fed to the reverse mapping processor. The reverse mapping processor 806 goes back from clauses groups that are assemblies of already mapped components to the corresponding clause. The output of the reverse mapping gets fed to the reverse SISR formatting processor 808. This processor 808 transforms back a clause along with its complements and conjunctions with other clauses into the natural sentence form.

Another implementation of the NLU application processor may be to perform the task of natural language translation. The goal of natural language translation is to translate a source text in the source language into an output text in the target language. In this task, a natural language source text is provided and NLU application processor is configured with lexicons corresponding to the source language and target language. The reverse mapper can then realize the translation task by translating the target components of the clauses utilizing a translation lexicon for the end terms and then applying the reverse mapping over the translated outcome to generate text in the target language.

Another embodiment of the NLU application processor contemplates the processing of vision related information and refers to the knowledge base and the system ability to process this information. The processing could assist for instance in image parts disambiguation. For example, the distinction between a television screen and a computer screen. The processing could devise also the relevant questions to be carried for further understanding and disambiguation. The image significance, essential points, possible implications could also be analyzed. For example the presence of a big hole in a boat implies that the boat is apt to sink. Moreover, the difference between two images in sequential pictures could be analyzed by the system to capture the nature of the on going act.

Yet another embodiment of the NLU application is an assistant for natural language parsing and disambiguation. As was described above, the system could assist in parsing by comparing the SISR data with the lexicons in order to delineate and adopt a sentence structure. The disambiguation also mentioned previously, is carried by starting from a parsing version and analyze it for concept consistency or contradiction. As such the version could be rejected or confirmed.

Whereas the above embodiments have described the NLU tasks of query answering and natural language translation, and vision processing, and parsing disambiguation, many other NLU tasks are also enabled using a general-purpose apparatus for natural language understanding. One of ordinary skill in the art will readily appreciate that a general-purpose apparatus for natural language understanding capable of transforming natural language text into a SISR format can be applied to a multitude of NLU tasks.

In an alternative embodiment of the invention, a multi-purpose NLU apparatus is contemplated capable of performing a plurality of NLU tasks. For each type of NLU task (i.e. an application request), the multi-purpose NLU apparatus multiplexes a plurality of NLU apparatuses, each configured to handle a different NLU task.

While the above is a complete description of the preferred embodiments of the invention sufficiently detailed to enable those skilled in the art to build and implement the system, it should be understood that various changes, substitutions, and alterations may be made without departing from the spirit and scope of the invention as defined by the appended claims.

What is claimed:

1. A general-purpose computing machinery apparatus for natural language understanding (NLU), wherein said apparatus accepts a digital natural language source text and outputs a target representation of the source text in a semantically-interpretable syntactic representation (SISR) form, said apparatus comprising:
a parser component that accepts the source text which is unstructured data and generates by processors an output of structured data in a SISR form;
a searcher component that accepts the parser output and generates a SISR of facts encoded in a knowledge base relevant to the SISR of the source text; and
a clause mapping component that receives the output of the parser and the output of the server and generates the target representation;
wherein the SISR of a natural language (NL) text is an outcome of a reverse engineering process of sentences construction, wherein in the said process, a sentence that is presumed to be constructed out of initial independent clauses through various operations as modifications of the said initial independent clauses and words addition (linking expressions) is worked out to identify the said initial independent clauses and added words, wherein SISR is a structured representation of standard templates and fields, wherein each initial independent clause existent in the said NL text is represented in a single entry, wherein each clause of the existent clauses in the said NL text represented in its complete, independent and declarative form and in the active voice, and in a complement-free (unless obligatory) manner and without the linking expressions and any conjunctions external to the clause and represented also in terms of units, wherein a unit comprises one or more words able to be associated together to represent a grammatical function as noun, verb, preposition, verbal phrase, adjective, comparative adjective, superlative adjective, superlative adverb, comparative adverb, or copula, and wherein each entry comprises: an entry identifier; a clause of the said existent clauses represented in terms of the said units in a syntax template; complements of the clause of the said existent clauses, represented in terms of the said units; and annotations; wherein the said annotations are data comprising information related to the entry and its components; wherein the said annotations are data comprising information related to the entry and its components, and wherein the target representation is an expanded SISR containing further semantic information of the SISR of the source text and the SISR facts.

2. The apparatus of claim 1 further comprising a lexicon database, the lexicon database comprising: a plurality of lexicons and a plurality of lists, wherein the lexicon database is configured to receive lookup requests from the source parser and wherein the lexicon database is configured to receive lookup requests from the clause mapping component.

3. The apparatus of claim 2, wherein the lexicon database further comprises a noun-categories lexicon where each left side entry is a noun corresponding to a right side entry that lists the possible semantic categories proper to the noun.

4. The apparatus of claim 2, wherein the lexicon database further comprises a semantic non-copula verb clauses lexicon where each left side entry of non copula category template clauses corresponds to one or more right side representations.

5. The apparatus of claim 4, wherein a right side entry of the semantic non-copula verb clauses lexicon contains an equal or less number of end-terms clauses than the number of end-terms clauses in the corresponding left side entry, wherein an end-term clause is a clause that does not get subjected to mapping.

6. The apparatus of claim 4, wherein the right side entry of the semantic non-copula verb clauses lexicon comprises: a clause that describes the status of the subject or object before the application of the verb unit of the clause; and a clause that describes the status of the subject or object after the application of the verb unit of the clause.

7. The apparatus of claim 4, wherein the right side entry of the semantic non-copula verb clauses lexicon expresses the assumed condition of the corresponding left side entry.

8. The apparatus of claim 4, wherein the right side entry of the semantic non-copula verb clauses lexicon states the assumed fact of the corresponding left side entry.

9. The apparatus of claim 4, wherein the right side entry of the semantic non-copula verb clauses lexicon comprises a neutral flag wherein the said neutral flag is set when the corresponding left side entry should not be treated as a ground truth.

10. The apparatus of claim 4, wherein the right side entry of the semantic non-copula verb clauses lexicon expresses a literal performance of the unit verb of the corresponding left side entry.

11. The apparatus of claim 4, wherein the right side entry of the semantic non-copula verb clauses lexicon expresses an assumed noun of the corresponding left side entry.

12. The apparatus of claim 2, wherein the lexicon database further comprises a semantic complements lexicon wherein the said lexicon consists of left side entries of clause prototype and complement type combination and the right side corresponding to one or more representations, where each representation consists of one or more complement free clauses and annotations.

13. The apparatus of claim 2, wherein the lexicon database further comprises a semantic adjective lexicon wherein the said lexicon consists of left side entries of adjective template clause and one or more right side corresponding representations, where each representation consists of clauses that don't have any adjective units other than base adjectives, wherein a base adjective is an adjective which if present in a clause then the clause is considered end-term clause provided that it cannot be mapped due to any other constituent distinct from said adjective.

14. The apparatus of claim 2, wherein the lexicon database further comprises a semantic comparative adjective lexicon wherein the said lexicon consists of left side entries of comparative adjective template clause and one or more right side corresponding representations.

15. The apparatus of claim 14, wherein each right side entry corresponding to a left side entry comprises three clauses, a first clause assigning a variable indicating a measure to one of the compared poles, a second clause assigning another similar variable to the second item of the compared poles; and a third clause representing a comparison between the two variables using a comparative adjective out of the base comparative adjectives list that is a base adjective.

16. The apparatus of claim 2, wherein the lexicon database further comprises a semantic superlative adjective lexicon wherein the said lexicon consists of left side entries of superlative adjective template clause and one or more right side corresponding representations.

17. The apparatus of claim 16, wherein each right side entry corresponding to a left side entry comprises three clauses: a first conditional clause expressing whether a variable element belongs to the comparison set pointed by a superlative adjective; a second conditional clause expressing whether the said variable element is different from the subject of the initial clause applied when the first clause is true; and a third clause that responds to the second clause and shows a relation of comparative adjective type between the subject and the variable element.

18. The apparatus of claim 2, wherein the lexicon database further comprises a lexicon mapping verbs to their corresponding time nature, where the time nature is one of instantaneous, span, or absolute.

19. The apparatus of claim 2, wherein the lexicon database further comprises a semantic lexicon of prototypes of consecutive noun phrases wherein each left side entry of noun phrases template prototype having consecutive simple noun phrases or nouns separated by propositions corresponds to a right side equivalent clause template, wherein equivalent clause template is built upon simplified nouns and their pre-modification words.

20. The apparatus of claim 2, wherein the lexicon database further comprises a semantic lexicon of the pre-modification words in a simple noun phrase wherein the said lexicon consists of left side entries of simple noun phrases template and the right side corresponding representation that consists of one or more equivalent clause templates.

21. The apparatus of claim 2, wherein the lexicon database further comprises a semantic lexicon of nominal compounds wherein the said lexicon consists of left side entries of two words nominal compounds and corresponding right side entries of clauses templates stating an equivalent meaning of the two words nominal compounds.

22. The apparatus of claim 2, wherein the lexicon database further comprises a linking expressions lexicon, wherein each left side linking expressions occurrence prototypes corresponds to a right side representation of the matching annotations and clauses.

23. The apparatus of claim 2, wherein the lexicon database further comprises an idioms lexicon wherein each left side entry of idiom, interjection or metonym corresponds to a right side of the equivalent meaning representation.

24. The apparatus of claim 2, wherein the lexicon database further comprises a list of various clause prototypes.

25. The apparatus of claim 2, wherein the lexicon database further comprises a base template clause type list, wherein a clause that corresponds to a base template clause is an end term clause.

26. The apparatus of claim 2 wherein the lexicon database further comprises a base adjective list.

27. The apparatus of claim 2 wherein the lexicon database further comprises a list of comparative adjectives that have a transitive property.

28. The apparatus of claim 2 wherein the lexicon database further comprises a list of prepositional phrase combinations that have a transitive property.

29. The apparatus of claim 1 wherein the said annotations of the entry clause comprise: a time limit annotation, specifying the time limits of the action of the entry clause, a field denoting whether the clause is originally a complement of another clause, a field denoting the identifier of a clause the entry clause is a complement of (if any), a field denoting the syntax template prototype, a field denoting whether the entry clause is from the original source text or derived in subsequent analysis, a field denoting the beginning time of the verb of the entry clause, a field denoting the end time of the verb of the entry clause, a field denoting the time nature of the verb of the entry clause, a field denoting the initial position in the entry clause of a complement, a field denoting the tense of the verb of the entry clause, a field denoting whether the entry clause itself or its root is derived from the knowledge base or the input source, a field denoting whether the entry clause is a conditional (e.g., if-then) expression, a field denoting the entry clause's associated conjunction, fields denoting the clauses to which the entry clause is linked to, a field denoting type of the link, a field denoting any linking expression, fields denoting the other clauses issued along with the entry clause out of the original sentence, a field denoting whether the entry clause was originally a dependent or independent clause in the sentence, a field denoting the initial clause form (declarative, interrogative, imperative), a field denoting the initial clause voice (passive, active), a field denoting the corresponding clause prototype of the verbal phrase complement, a field denoting the clause's context (information that could be obtained with the input), a field denoting the corresponding prototype of the verbal phrase complement, a field denoting the clause that the current clause is issued from (upon mapping) in case it is so.

* * * * *